Jan. 15, 1963 L. A. HUDSON 3,073,404
SHOPPING CART PICKUP MACHINE
Filed Jan. 9, 1961 2 Sheets-Sheet 1
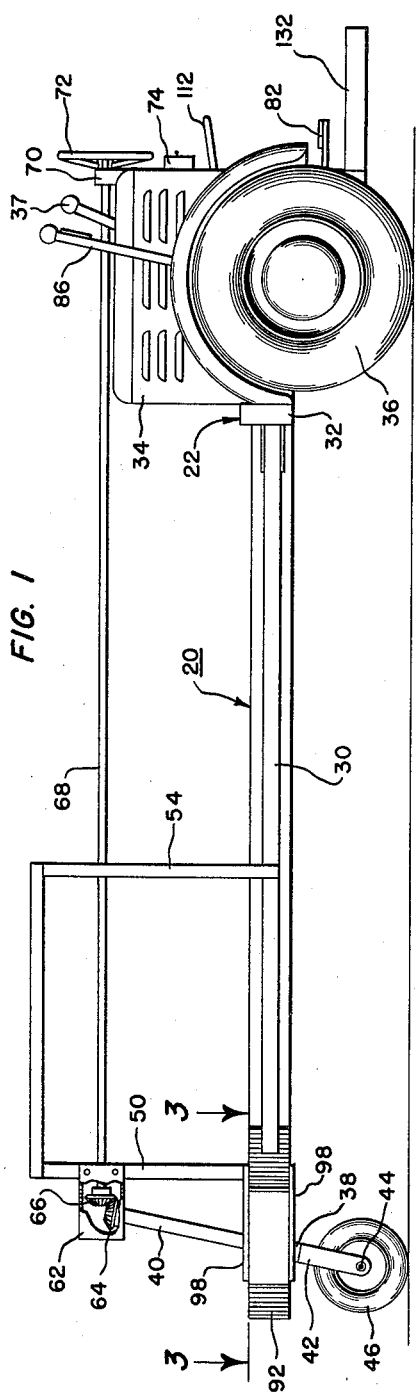
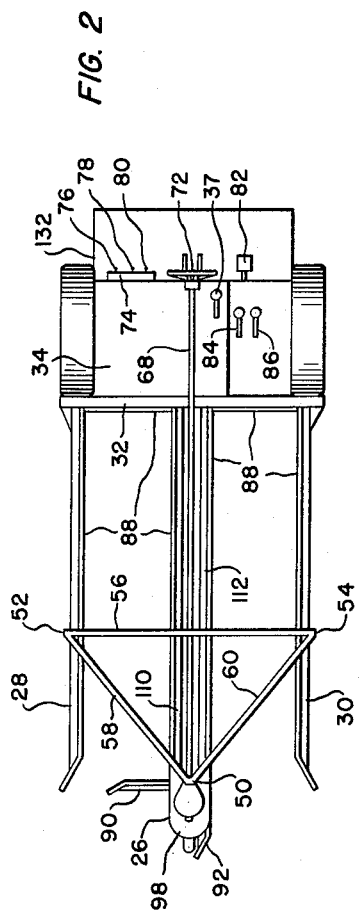
INVENTOR.
LLOYD A. HUDSON
BY Fulwider, Mattingly
& Huntley
ATTORNEYS

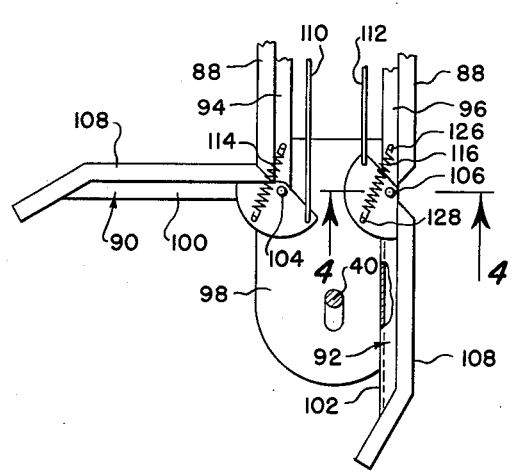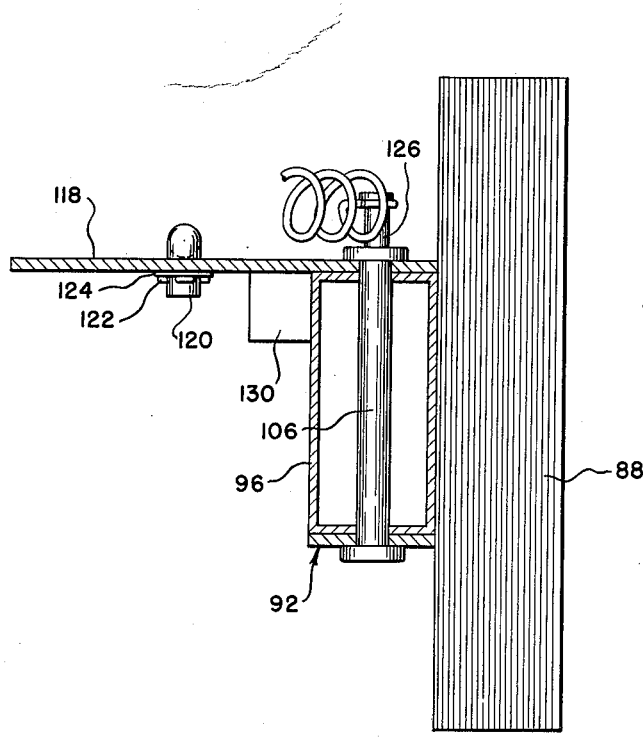

United States Patent Office 3,073,404
Patented Jan. 15, 1963

3,073,404
SHOPPING CART PICKUP MACHINE
Lloyd A. Hudson, 325 54th St., San Diego 14, Calif.
Filed Jan. 9, 1961, Ser. No. 81,423
3 Claims. (Cl. 180—27)

The present invention relates to a machine for moving carts having wheels, which carts, for example, are of the type which the customers use in markets.

The machine of the present invention comprises a main frame having forwardly extending rails which are spaced horizontally from one another and includes a rear abutment extending between the rails. This frame is provided with wheels for supporting the same. The rails are spaced horizontally from one another a distance at least equal to the width of the carts so that they span the carts. A gate is provided at the front end of the rails which may be opened so that the rails can be moved to span the carts, and which may be closed for entrapping a cart or carts so that, after spanning the cart or carts by the rails, the machine, upon moving in the opposite direction i.e. rearwardly, the entrapped carts are moved rearwardly with the machine.

The machine includes, preferably, a motor for driving the wheels, a support for the person operating the machine, and mechanism accessible to the person for steering the machine and for actuating the gate or gates.

The machine also includes three forwardly extending rails, the center rail being common to both outer rails. The forward end of the center rail is provided with one of the supporting wheels. The wheel is mounted for movement about a vertically extending shaft which is adapted to be oscillated for steering the machine. Also, preferably, the center or common rail is provided with the hinging means for the gate.

Certain advantages will be apparent from the following description, reference being had to the accompanying drawings wherein a preferred embodiment of the invention is illustrated.

In the drawings:

FIG. 1 is a left side view of the machine;

FIG. 2 is a top plan view of the machine but on a smaller scale;

FIG. 3 is a view looking in the direction of line 3—3 of FIG. 1 but shifted ninety degrees and on a larger scale; and FIG. 4 is a fragmentary sectional view taken along line 4—4 of FIG. 3 but on a larger scale.

Referring more in detail to the drawings, the machine comprises a carirage 20 including a main frame 22. This main frame includes three forwardly extending rails 26, 28 and 30. These three rails lie in the same horizontal plane and are connected with one another at the rear by transversely disposed support portion 32.

The top of the rear section of the frame 22 carries a motor 34 which may be of the electric type or may be an internal combustion engine. The frame 22 is carried by two aligned rear wheels, one of which is shown at 36, which rear wheels are driven through transmission and differential gearing (not shown) by the motor. The forward and rearward movement of the carriage is controlled by a gear shift lever 37.

The forward end of the center or common rail 26, carries a vertically extending bearing 38 for a rotatable shaft 40. The lower end of this shaft has fixed thereto a fork 42, the tines of which carry an axle 44 for a front wheel 46. The machine is steered through the manipulation of the shaft 40.

The frame 22 is provided with a sub-frame at the front thereof comprising an upright 50 which is carried by the center rail 26, two rearwardly disposed uprights 52 and 54 which are carried, respectively, by the rails 28 and 30, a rear brace 56 which spans the uprights 52 and 54, and two forwardly extending braces 58 and 60, brace 58 being connected to the top of upright 52 and to the top of upright 50, and brace 60 being connected to the top of upright 54 and to the top of upright 50. These uprights and braces may be formed of steel and secured to one another as by welding. In this manner the rails are maintained in desired space relationship with one another.

The front of upright 50 carries a gear housing 62. The shaft 40 extends into this gear housing and is provided at the upper end thereof with a beveled gear 64 which meshes with a beveled gear 66 carried by the forward end of a horizontally extending shaft 68. This housing 62 also provides bearings for the shafts 40 and 68. The rear end of the shaft is journaled in a bearing 70 and carries a steering gear 72. By turning the steering gear, the shaft 40 can be oscillated through the shaft 68 and beveled gears 66 and 64. In this manner the direction of movement of the machine can be controlled.

The rear of the motor housing 34 carries an instrument panel 74 which has rearwardly projecting elements 76, 78 and 80 for controlling the ignition, the choke and the accelerator for the motor when the same is an internal combustion engine. Any suitable type of clutch may be interposed between the motor and the differential and is operated by a clutch pedal 82. A standard type brake mechanism is employed, preferably of a mechanical type including the brake drum and shoes. The shoes are actuated either independently or in unison by brake levers 84 and 86. By locking, for example, the left brake and then turning the fork 42 in a counterclockwise direction through the steering wheel 72, the machine can be made to turn on an arc in which the bottom of the wheel 36 is the axis. Thus the machine may be turned in the shortest possible radius.

The confronting sides of the rails 26, 28 and 30 are lined with yieldable material such as wood and the front of the transverse portion 32 is also so lined. This material is shown at 88. The rails including the lining 88 are spaced horizontally from one another a distance at least equal to the width of, for example, a mobile cart such as that used by customers in markets. The machine is used for moving these carts. After the customer leaves the market, he is apt to leave the cart which he had used for hauling his purchases, at various places in the automobile parking lot. The present invention is used for corralling these carts and then returning them to a storage space, usually within the market, for the carts. In a machine of this type it is necessary that it not only can collect the carts while moving forward, but it also must be capable of retaining the carts either between the rails 26 and 28 or between the rails 26 and 30, and for this purpose there are provided gates which are adapted to substantially span, in a horizontal direction, the spaces between rails 26 and 28 and rails 26 and 30, respectively.

These gates are more clearly shown in FIGS. 3 and 4 at 90 and 92, gate 90 being shown as closed and gate 92 being shown as open. Preferably the rails 26, 28 and 30 are formed of angle irons, and the rail 26 comprises two parallel angle irons 94 and 96 which are joined at the front end by plates 98. The gates 90 and 92 include, respectively, angle iron sections 100 and 102 which are mounted, respectively, on pivot pins 104 and 106 carried, respectively, by rail angle irons 94 and 96. These gates also are lined with wood 108. The gates 90 and 92 are actuated, respectively, by rods 110 and 112. The gates are held either closed or open by springs 114 and 116. The gates are moved beyond dead center positions with respect to the pivot pins and springs by the rods 110 and 112. It will be seen that when the rod 110 is moved rearwardly, i.e. upwardly as is shown in FIG. 3, the spring 114 will be moved beyond the dead center position with respect to its ends and the pin 104, and will yieldingly retain the gate 90 in open position. Likewise when the rod 112 is moved forwardly, i.e. downwardly as viewed in FIG. 3, the spring 116 will be moved beyond its dead center position so as to resiliently hold the gate 92 in closed position. These rods 110 and 112 extend to the rear of the motor housing 34 and below the steering wheel 72 where they are readily accessible to the operator of the machine.

Referring more in detail to FIGS. 3 and 4, the channel iron 102 is welded to the plate 118 and serves to pivotally connect gate 92 to the vehicle frame 96 by the pivot pin 106. The rod 112 is shown as having a forward end extending downwardly as at 120; it extends through an opening in the plate 118 and is held in place by a cotter pin 122. A washer 124 is interposed between the cotter pin and the underside of the plate 118. A rear pin 126 is carried by the angle iron 96 and a like pin 128 (see FIG. 3) is carried by the plate 118 and the spring 116 is connected to these pins 126 and 128 and is under tension. Suitable stops, one of which is shown at 130, are carried by the plates 118 for limiting the movement thereof to ninety degrees, that is from the positions shown in FIG. 3.

The rear of the frame 22 carries a platform or operator's support 132 on which the operator is carried. It will be observed that the controllers 76, 78, 80, the steering wheel 72, the rods 110 and 112, and the levers 84 and 86 are all accessible to the operator when he is on the platform.

In operating the machine, the gates 90 and 92 are moved to the open position, namely the position shown for gate 92 in FIG. 2. The machine is moved forwardly so as to span the cart to be collected. Often it is necessary to move rearwardly after entrapping the cart, for example the cart may be against an abutment or a parked automobile. After the rails have been moved to span the cart, the respective gate is then closed so as to entrap the cart between the rails and the gate. As the carts are collected, the machine is moved forwardly to the desired position, the rearmost cart engaging the wood paneling on the transversely disposed portions 32. A large number of these carts can be collected between each pair of rails. While moving forwardly, the gates may be opened and then after the carts have been moved to the proper storage place, the machine is moved rearwardly, withdrawing the same from the placed carts. In this manner positioning the carts in aligned relationship at the proper storage place.

While the form of embodiment herein shown and described constitutes a preferred form, it is to be understood that other forms may be adopted falling within the scope of the claims that follow.

I claim:
1. A machine for moving carts having wheels such as those employed in markets, said machine comprising:
(A) A carriage including:
(1) a frame, said frame comprising:
(a) a plurality of parallelly disposed rails, spaced horizontally from one another a sufficient distance to receive a cart, and being of such length as to receive a plurality of said carts;
(b) said frame including means at the rear of the carriage forming:
(i) A support for the rear ends of the rails and a rear abutment for the carts, and
(ii) a section disposed rearwardly of said support;
(c) means adjacent the front ends of the rails for maintaining the same in desired horizontal spaced relationship with one another;
(2) a pair of ground wheels disposed on opposite sides of said rear section of the frame for supporting the rear of the frame;
(3) a motor carried by said rear section of the frame and operatively connected with the rear wheels for driving the latter;
(4) a vertically extending bearing carried by the front end of one of said rails;
(5) a vertically extending shaft journaled for oscillating movement in said bearing;
(6) a ground wheel carried by the shaft for guiding the carriage;
(7) an operator's support carired by the frame rearwardly of the motor;
(8) gate means hingedly connected with the front end of one of said rails, said gate means being movable from a position substantially parallel with said latter mentioned rail to a position substantially bridging the space between it and the next adjacent rail;
(9) means accessible to an operator when on the operator's support for swinging said gate means from either of the two positions to the other of the two positions;
(10) and means accessible to an operator when on the operator's support for manipulating said shaft for guiding the carriage.

2. A machine as defined in claim 1, in which the rails include a center rail and side rails on either side thereof and in which the shaft bearing is carried by the forward end of the center rail.

3. A machine as defined in claim 1, in which the rails include a center rail and side rails on either side thereof and in which the shaft bearing is carried by the forward end of the center rail, and pivot means for the gate means is carried by the center rail.

References Cited in the file of this patent
UNITED STATES PATENTS

| | | |
|---|---|---|
| 1,446,805 | Martin | Feb. 27, 1923 |
| 2,104,362 | Cummings | Jan. 4, 1938 |
| 2,169,916 | Keeler | Aug. 15, 1939 |
| 2,395,334 | Lichtenberg | Feb. 13, 1946 |
| 2,556,592 | Markkula | June 12, 1951 |
| 2,952,469 | Kiel | Sept. 13, 1960 |